Aug. 14, 1923.

A. E. STACEY, JR 1,465,028

METHOD OF AND APPARATUS FOR CHILLING MATERIALS SUCH AS MEAT

Filed Sept. 17, 1918 2 Sheets-Sheet 1

INVENTOR
Alfred E. Stacey Jr.
By Wilhelm & Parker
ATTORNEYS.

Aug. 14, 1923.

A. E. STACEY, JR 1,465,028

METHOD OF AND APPARATUS FOR CHILLING MATERIALS SUCH AS MEAT

Filed Sept. 17, 1918    2 Sheets-Sheet 2

INVENTOR.

Alfred E. Stacey Jr.
By Wilhelm Parker
ATTORNEYS.

Patented Aug. 14, 1923.

1,465,028

UNITED STATES PATENT OFFICE.

ALFRED E. STACEY, JR., OF CHICAGO, ILLINOIS, ASSIGNOR TO CARRIER ENGINEERING CORPORATION, OF NEW YORK, N. Y.

METHOD OF AND APPARATUS FOR CHILLING MATERIALS SUCH AS MEAT.

Application filed September 17, 1918. Serial No. 254,496.

*To all whom it may concern:*

Be it known that I, ALFRED E. STACEY, Jr., a citizen of the United States, residing at Chicago, in the county of Cook and State of Illinois, have invented a new and useful Improvement in Methods of and Apparatus for Chilling Materials such as Meat, of which the following is a specification.

Several methods and kinds of apparatus have been used in packing houses for chilling meat. It has been customary to cool to a low temperature, approximately from 20° to 30° F., the chill room in which the meat is cooled before introducing the meat into the room. The fresh killed meat is then brought directly from the killing floors into this very cold room. There is, therefore, a very great difference between the vapor pressures of the air in the chill room and of the moisture in the meat, and the first steps of the cooling are performed at the expense of the latent heat of the moisture evaporating from the meat. This causes an excessive shrinkage and probably a large percentage of the loss occurs during these early stages of the cooling. Formerly, the chill rooms were cooled by brine pipes in which the refrigerating coils are located directly in these rooms. This system was replaced by the so called "bunker system" in which the refrigerating coils are located in a refrigeration chamber over the chill room and communicating with the latter by openings in the bottom of the refrigeration chamber which provide for a natural circulation of air through the chill room and the refrigeration chamber. Later on, these coils were replaced by spray nozzles so that the liquid refrigerant was brought into direct contact with the circulating air. One method of operation was to cool the chill room to a low temperature, as explained, and then bring in the fresh killed meat and turn off the refrigerating apparatus until the temperature in the chill room rose to about 50° F. Refrigeration was then started again and continued until the meat was at the desired temperature.

One of the objects of this invention is to chill material, such as fresh killed meat and sausage, which gives off heat and moisture, to the desired temperature ordinarily, in the case of meat, to about 36° F., in a practical economical manner with the minimum evaporation of moisture from the material in order to prevent the shrinkage and loss in weight of the material which is incident to the methods of chilling meat heretofore practiced. Another object is to provide a method of chilling meat adapted to be practiced in chill rooms of the kind used at the present time in packing houses and to provide a control apparatus for carrying out the method which can be installed in such chill rooms with the minimum expense and change in the chill rooms and their refrigerating apparatus.

In accordance with the method of this invention, air, which may be taken from the chill room, is discharged into the refrigeration chamber under pressure and at a relatively high velocity through restricted nozzles or discharge orifices which are located preferably along one side of the refrigerating chamber near one of the openings connecting with the chill room so as to induce a circulation of the relatively much larger volume of air in the chill room and refrigeration chamber, causing the air to flow through the refrigeration chamber where it is cooled by contact with the cold liquid spray, then descend from the refrigeration chamber through one of the openings in the bottom thereof, pass through the chill room and return to the refrigeration chamber through another of the openings in the bottom of the latter. The dew point of the cool air delivered to the chill room is regulated in such a way as to maintain only a small difference between the vapor pressure of the atmosphere in the chill room and the vapor pressure corresponding to the temperature of the meat or material in the chill room and keep the temperature in the chill room below that of the material, so that the material will be chilled with very little vaporization of the moisture from the material. Since the material gives off both heat and moisture, it raises the temperature and also the dew point of the air in the chill room with any supply of air which is commercially practical. It is desirable to maintain a relative humidity of the air in the chill room near the saturation point but it is impracticable to maintain an actual saturated condition because of the heat given off by the material which raises the temperature in the chill room. When the meat is brought into the chill room it is intended with this process to bring the temperature in the room as near that of the meat as it is practicable to have it and yet insure sufficient cooling of the meat. At the commencement of the chilling process the temperature in the chill room is preferably regulated at about 70° F. and a sufficiently high dew point is maintained to prevent objectionable shrinkage and not require too long a time for the cooling. Preferably the humidity is approximately 75 per cent. A dew point of 61° with a dry bulb temperature of 70° corresponds to a relative humidity of 75 per cent. The circulating cool air passing through the chill room cools the room and the meat therein, and by decreasing the dew point of the refrigerated air as the cooling proceeds, the necessary lowering of the temperature in the chill room is accomplished.

The dew point of the cool air delivered to the chill room can be regulated in different ways to secure the desired difference in vapor pressures between the atmosphere in the chill room and the moisture in the material. For instance, a hygrostat can be employed which responds to variations in the relative humidity in the chill room and controls the temperature of the liquid spray by which the air is cooled. Another way of accomplishing this is by means of a differential thermostat having two thermo-responsive elements, one arranged to respond to changes in the temperature of the refrigerant which is sprayed into the air and the second element arranged to respond to changes in the temperature of the return air from the chill room, these two elements cooperating to maintain a definite difference in temperature between the refrigerant and return air.

The accompanying drawings disclose two forms of apparatus embodying the invention and adapted for carrying out the hereindescribed method. In said drawings.

Figure 1:
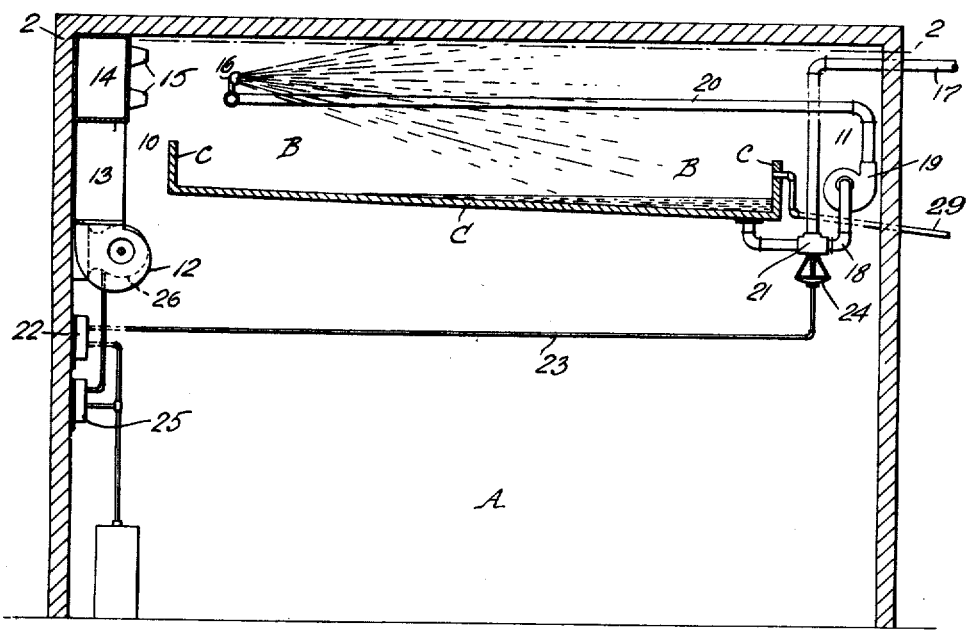
Fig. 1 is a diagrammatic sectional elevation of an apparatus provided with a hygrostatic control.
Figure 2:
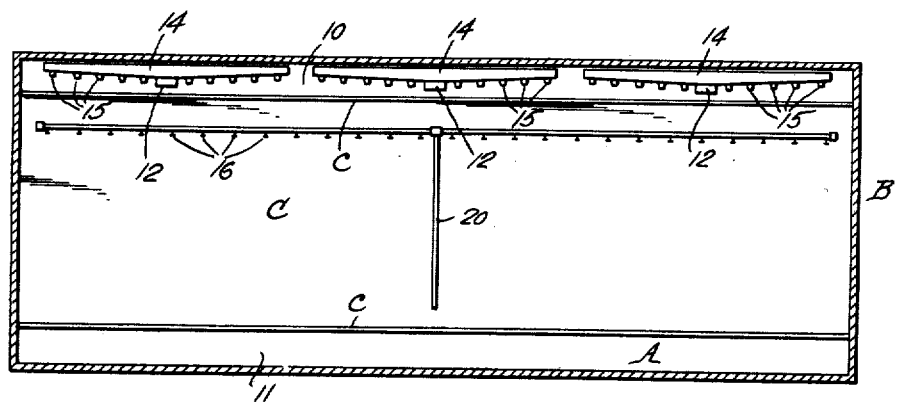
Fig. 2 is a sectional plan thereof on line 2—2, Fig. 1.

A represents a chill room, or room in which the meat or material to be cooled is contained and B represents a refrigeration or spray chamber which is preferably located above and is separated from the chill room by a spray deck or floor C. The spray deck shown extends the full length of the chill room, leaving openings 10 and 11 at opposite sides of the spray deck for the ascent and descent of the air respectively from the chill room to the refrigeration chamber and from the latter to the former. The spray deck has upwardly extending side flanges or walls c adapting it to hold spray liquid collecting on the deck.

12 indicates a fan which, as shown, is located adjacent to the ascending opening 10 with its eye communicating with the chill room so as to draw air therefrom and deliver the same through a discharge pipe 13 to an air duct 14 which extends along one side of the refrigeration chamber B. This discharge duct is provided with a series of nozzles 15 or restricted outlet orifices arranged to discharge air in separate streams or jets into the refrigeration chamber in a direction toward the far side thereof. The air is discharged through these nozzles 15 under sufficient pressure and at a velocity such as to induce a circulation of the air in the chill room and refrigeration chamber, causing it to ascend through the opening 10 at one side of the chill room, pass through the refrigeration chamber B, descend through the other opening 11 and return through the chill room and first opening 10, a relatively much larger volume of air being thus continuously circulated through the refrigeration chamber and chill room. Preferably, several of the fans 12 are provided at intervals along the side of the chill room in the case of a large room, each delivering to a separate discharge duct 14, so that each fan and duct handle the air from the section or portion of the chill room in the vicinity of the fan. Together the discharge ducts preferably extend practically the full length of the chill room. 16 represents a series of spray nozzles for brine or other suitable liquid refrigerant for cooling the circulating air in the refrigeration chamber. The brine or refrigerant is supplied from a brine tank (not shown) through a supply pipe 17 to a pipe 18 which leads from the spray deck to the intake of a circulating pump 19 which delivers the brine or refrigerant through a pipe 20 to a header for the spray nozzles 16. 21 is a valve which controls the flow of the brine from the pipe 17 and the spray deck to the circulating pump. Depending upon the position of this valve, the pump draws the brine either from the supply pipe 17 or from the body of spray liquid collecting on the spray deck or in varying proportions from both of these sources. The brine supplied through the pipe 17 is cooled by suitable refrigerating means not shown, whereas the brine collecting on the spray deck is relatively warmer, being warmed more or less by contact with the air in the refrigeration chamber B. The temperature of the brine or refrigerant sprayed into the air in the refrigeration chamber B thus depends upon the position of the valve 21 and since the circulating air comes into intimate contact with the spray, the air is dehumidified or brought to a saturation point at a temperature depending upon the temperature of the spray, which thus determines the dew point of the circulating air. 29 indicates an overflow pipe for returning surplus brine from the spray deck to the brine tank.

In the apparatus illustrated in Fig. 1 the temperature controlling valve 21 is controlled by a suitable hygrostat 22 which responds to changes in the humidity of the air in the chill room or returning to the refrigeration chamber and actuates the valve 21 through suitable means, as for instance through the medium of compressed air in a pipe 23 and a valve actuating motor 24 operated by this compressed air. The dew point of the air delivered to the chill room is thus regulated under the control of the humidity conditions in the chill room. The hygrostat 22 may be either of that type having a hygroscopic element, such as silk, which responds to variations in the humidity of the air affecting it, or it may be of the type having wet and dry bulb elements responding respectively to the wet and dry bulb temperatures of the surrounding air. In the case of the former type of hygrostat, the difference in vapor pressure between the air in the chill room and the moisture in the meat or material decreases as the meat cools down because the difference between the wet and dry bulb temperatures decreases as the dry bulb temperature lowers. A wet and dry bulb hygrostat would maintain a more nearly constant difference between the vapor pressures as the meat cools. On account of this difference in action between the two types of hygrostats, the hygrostat having the hygroscopic element is considered preferable.

25 represents a thermostat of any suitable kind located so as to respond to changes in temperature in the chill room. This thermostat determines the minimum temperature in the chill room to prevent the cooling of the chill room in the case of meat, for instance, below about 36° F., in order to lessen the evaporation from the meat and prevent the meat from freezing. Any suitable means controlled by this thermostat can be used for giving the desired minimum temperature. For instance, the thermostat can be arranged as indicated diagrammatically in Fig. 1, to control the driving motor 26 for the air circulating fan. When the temperature in the chill room reaches the desired minimum the thermostat acts to stop or slow down the motor so as to stop or reduce the circulation of the air and thereby prevent further cooling of the room.

Figure 3:
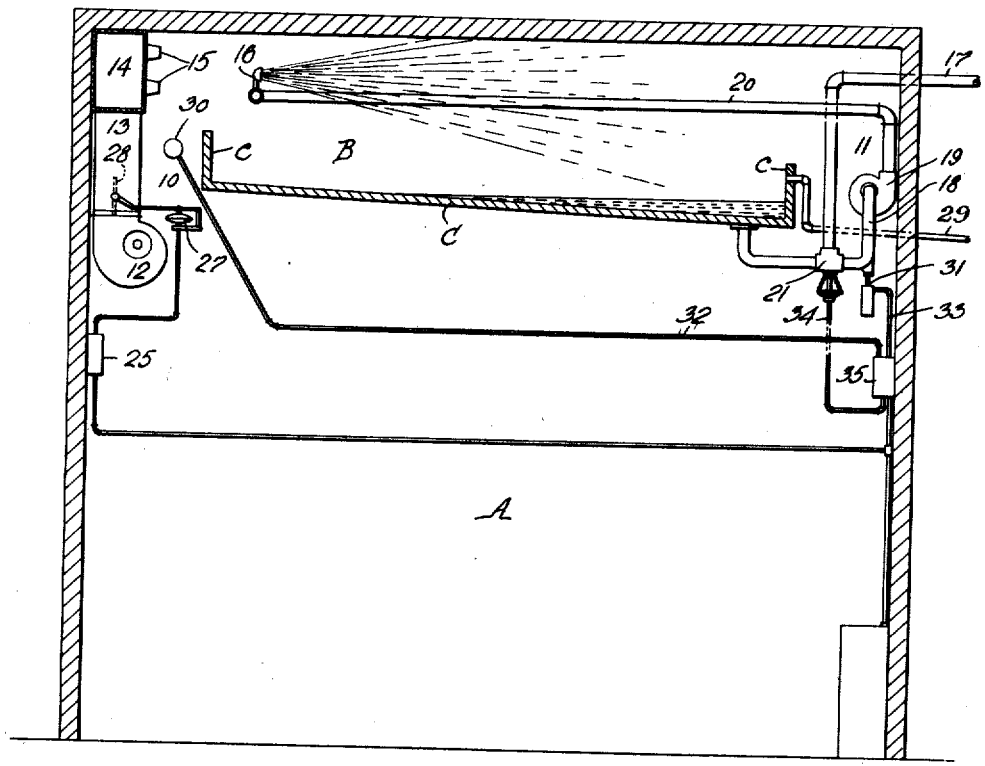
Fig. 3 is a view similar to Fig. 1 of an apparatus provided with a differential thermostatic control.

In the apparatus shown in Fig. 3, the thermostat 25 is operatively connected with an air motor 27 which actuates a damper 28 in the air discharge pipe. When the chill room is cooled to the desired temperature for which the thermostat is set, this damper 28 is operated to reduce or shut off the discharge of air from the fan and thus stop or reduce the circulation of the air through the chill room.

In the apparatus shown in Fig. 3, the position of the controlling valve 21 in the brine circulating pipe is determined under the control of a differential thermostat having two thermo-responsive elements, one of which, 30, is located so as to be influenced by the return air from the chill room and the other of which, 31, is located in the brine circulating pipe so as to respond to changes in the temperature of the refrigerant which is sprayed into the air. These two elements 30 and 31 operate for instance through the medium of compressed air in the pipes 32, 33 and 34 and a suitable interposed regulating device 35 on the actuating motor for the valve 21. This differential regulating device can be constructed as disclosed in Patent No. 1,018,551, granted Feb. 27, 1912, or of any other suitable construction. The position of the controlling valve 21 therefore depends upon the differential action of the two thermo-responsive elements 30 and 31 and maintains a desired difference in temperature between air returned to the refrigerating chamber and the spray liquid. This controls the dew point and the dehumidifying effect of the circulating air.

When the controlling instrument, whether it be the hygrostat shown in Fig. 1 or the differential thermostat shown in Fig. 3, has been properly set for the required conditions, it will cause the circulating air to be delivered to the chill room at a dew point lower than that existing in the chill room, such that the air will lower the temperature in the chill room and maintain the desired small difference between the vapor pressures of the moisture from the material and of the atmosphere in the room, notwithstanding that both of these vapor pressures decrease as the cooling proceeds. The controlling instrument is preferably set so as to effect a decreasing vapor pressure of the atmosphere in the room not less than approximately 75 percent of the decreasing vapor pressure corresponding to the temperature of the material. When the material has been cooled to approximately the desired temperature, the thermostat operates to stop or reduce the circulation of the cool air and thus prevents the further lowering of the temperature.

I claim as my invention:—

1. The herein described method of cooling material, such as meat, which gives off heat and moisture, consisting in maintaining the material in an atmosphere having a humidity below saturation and maintaining a relatively small difference between the vapor pressure corresponding to the temperature of the material and the vapor pressure of the atmosphere in the room containing the material, and maintaining the temperature in the room below the temperature of the material, whereby the material will be chilled with a relatively small vaporization of moisture therefrom.

2. The herein described method of cooling material, such as meat, which gives off heat and moisture, consisting in supplying cool air to the room containing the material and decreasing the dew point of such supplied air as the cooling proceeds so as to maintain a relatively small difference between the vapor pressure corresponding to the temperature of the material and the vapor pressure of the atmosphere in the room, and to maintain the temperature in the room below the temperature of the material, whereby the material will be chilled with a relatively small vaporization of moisture therefrom.

3. The herein described method of cooling material, such as meat, which gives off heat and moisture, consisting in maintaining a material-cooling atmosphere without free moisture in the room containing the material and maintaining the vapor pressure of said atmosphere lower than the decreasing vapor pressure corresponding to the temperature of the material and at least approximately seventy-five percent of said last mentioned vapor pressure, whereby the material will be chilled with a relatively small vaporization of moisture therefrom.

4. The herein described method of cooling material, such as meat, which gives off heat and moisture, consisting in supplying cool air to the room containing the material and reducing the dew point of such air under the control of the changing atmospheric conditions in the chill room as the cooling proceeds so as to maintain a relatively small difference between the vapor pressure corresponding to the temperature of the material and the vapor pressure of the atmosphere in the room, and to maintain the temperature in the room below the temperature of the material, whereby the material will be chilled with a relatively small vaporization of moisture therefrom.

5. The herein described method of cooling material, such as meat, which gives off heat and moisture, consisting in causing the circulation of air through the room containing the material and through a refrigeration chamber, spraying a cold liquid into the circulating air in the refrigeration chamber, and regulating the dew point of the circulating air in the refrigeration chamber under the control of the differential temperatures of the liquid spray and the air returned to the refrigeration chamber so as to maintain a relatively small difference between the vapor pressure corresponding to the temperature of the material and the vapor pressure of the atmosphere in the room, and to maintain the temperature in the room below the temperature of the material, whereby the material will be chilled with a relatively small vaporization of moisture therefrom.

6. The herein described method of cooling material, such as meat, which gives off heat and moisture, consisting in causing the circulation of air through the room containing the material and through a refrigeration chamber, varying the dew point of the circulating air in the refrigeration chamber so as to maintain a relatively small difference between the decreasing vapor pressure corresponding to the temperature of the material and the decreasing vapor pressure of the atmosphere in the room, and controlling the circulation of the air to prevent the temperature in the room from dropping below a predetermined minimum degree.

7. The combination of a chill room containing the material to be cooled, a refrigeration chamber communicating with the same by inlet and return air openings, means for causing an active circulation of air through said room and chamber, means for spraying a cold liquid into the circulating air to cool the same, and a differential thermostat having two thermo-responsive elements influenced respectively by the spray liquid and by the return air from the chill room and means controlled thereby for regulating the dew point of the air in the refrigeration chamber to maintain a small difference between the vapor pressure corresponding to the temperature of the material and the vapor pressure of the atmosphere in the chill room.

Witness my hand this 12th day of September, 1918.

ALFRED E. STACEY, Jr.

Witnesses:
M. G. NICHOLSON,
W. L. BRONAUGH.

Certificate of Correction.

It is hereby certified that in Letters Patent No. 1,465,028, granted August 14, 1923, upon the application of Alfred E. Stacey, jr., of Chicago, Illinois, for an improvement in "Method of and Apparatus for Chilling Materials such as Meat," an error appears in the printed specification requiring correction as follows: Page 1, line 28, strike out the words " in which the refrigerating coils are located " and insert instead *or direct expansion ammonia pipes located;* and that the said Letters Patent should be read with this correction therein that the same may conform to the record of the case in the Patent Office.

Signed and sealed this 11th day of September, A. D., 1923.

[SEAL.]

KARL FENNING,
*Acting Commissioner of Patents.*